United States Patent [19]

Oka et al.

[11] 4,057,296
[45] Nov. 8, 1977

[54] BRAKE CONTROL VALVE ASSEMBLY FOR EFFECTING INCREASED REAR BRAKING ACTION UPON MALFUNCTION OF THE FRONT SYSTEM

[75] Inventors: Hiroyuki Oka; Masashi Ishihara, both of Toyodashi, Japan

[73] Assignee: Toyota Jidosha Kogyo Kabushiki Kaisha, Japan

[21] Appl. No.: 722,501

[22] Filed: Sept. 13, 1976

[30] Foreign Application Priority Data

Sept. 17, 1975   Japan ................................ 50-112422

[51] Int. Cl.$^2$ .............................................. B60T 8/26
[52] U.S. Cl. .................... 303/6 C; 188/349; 303/84 A
[58] Field of Search .............. 303/6 C, 6 R, 84 A, 303/84 R, 24 F; 188/349, 151 A, 345; 200/82 D; 340/52 C

[56] References Cited

U.S. PATENT DOCUMENTS

| 3,464,741 | 9/1969 | Falk ................................... 303/6 C |
| 3,586,384 | 6/1971 | Falk ................................... 303/6 C |
| 3,661,426 | 5/1972 | Tam .................................... 303/6 C |
| 3,674,954 | 7/1972 | Kish et al. ......................... 303/6 C X |
| 3,708,211 | 1/1973 | Bueler ................................ 303/6 C |
| 3,754,792 | 8/1973 | Ishigami et al. .................... 303/6 C |

*Primary Examiner*—Trygve M. Blix
*Assistant Examiner*—Douglas C. Butler
*Attorney, Agent, or Firm*—Browdy and Neimark

[57] ABSTRACT

The piston of a brake control valve assembly is balanced, during normal front hydraulic system operations, at a predetermined position to allow pressurized brake fluid from a rear master cylinder to flow into a rear wheel cylinder from between a head flange and a seal valve with a predetermined pressure. When the braking operation is sought during trouble or failure in the front hydraulic system, the piston loses its regulated balance and moves, together with a piston sleeve and the seal valve so that the effective area for receiving brake fluid pressure from a rear master cylinder becomes greater than that of the rear wheel cylinder thereby to increase brake fluid pressure transmitted to the rear wheel cylinder. The present invention features particularly the improvement, or reversewise utilization, of the conventional proportioning valve mechanism to permit a very rational brake fluid pressure boosting operation.

9 Claims, 4 Drawing Figures

BRAKE CONTROL VALVE ASSEMBLY FOR EFFECTING INCREASED REAR BRAKING ACTION UPON MALFUNCTION OF THE FRONT SYSTEM

BACKGROUND OF THE INVENTION

This invention relates to a brake control valve assembly, particularly useful in vehicle braking systems and, more particularly, to such an assembly which assures an increased effectiveness of rear wheel braking upon failure of the hydraulic system associated with front wheel brakes.

According to the conventional dual-system tandem master cylinder mechanism generally used in automobile brake systems, when the front hydraulic system fails, merely the braking pressure of the same magnitude as provided by brake fluid pressure in the rear master cylinder during the normal operation is transmitted to the rear wheel cylinders. Even in case a proportioning valve with a by-pass circuit is incorporated, such proportioning valve is disabled and the braking pressure equal to brake fluid pressure in the rear master cylinder is transmitted by way of a by-pass valve. Consequently, when trouble should occur in the front hydraulic system, no satisfactory braking force would be provided by brake fluid pressure from the rear master cylinder of the type designed such that maximum brake fluid pressure stays lower than the limit point of rear wheel locking force in the front and rear wheel braking force curve.

SUMMARY OF THE INVENTION

The principal object of the present invention is to provide a brake control valve which is capable of eliminating the problem of insufficient rear wheel cylinder braking brake fluid pressure caused by trouble in the front hydraulic system.

It is another object of the present invention to provide a brake control valve assembly which features reverse utilization of the low-pressure braking force distributing function of the conventional proportioning valve assembly.

It is an additional object to provide a brake control valve assembly which is reliable in operation, inexpensive to manufacture and commercially acceptable, while accomplishing the other stated objects as well.

The present invention which is designed to accomplish the stated objects, as well as others which are to become apparent from the text below, is characterized basically by a number of structural arrangements. Durng normal operation of a front hydraulic system, a piston of the control valve assembly is balanced at a predetermined position to allow pressurized brake fluid from a rear master cylinder to pass into rear wheel cylinders from between a head flange and a seal valve with a predetermined pressure, but when trouble develops in the front hydraulic system, the braking operation results in the piston losing its regulated balance and moving, together with the piston sleeve and the seal valve so that the effective area for receiving brake fluid pressure from the rear master cylinder becomes greater than that of the rear wheel cylinder to increase brake fluid pressure transmitted to the rear wheel cylinder. The pressurized brake fluid feed and discharge switchover behavior of the control valve is effectuated by a control piston disposed in the front system brake fluid pressure passage such that the modified operation will be performed whenever the front hydraulic system brake fluid pressure is inoperative, and the reverse operation, or proportioning valve operation, is performed when the brake fluid pressure is normal.

DETAILED DESCRIPTION OF PREFERRED EMBODIMENTS

Figure 1:
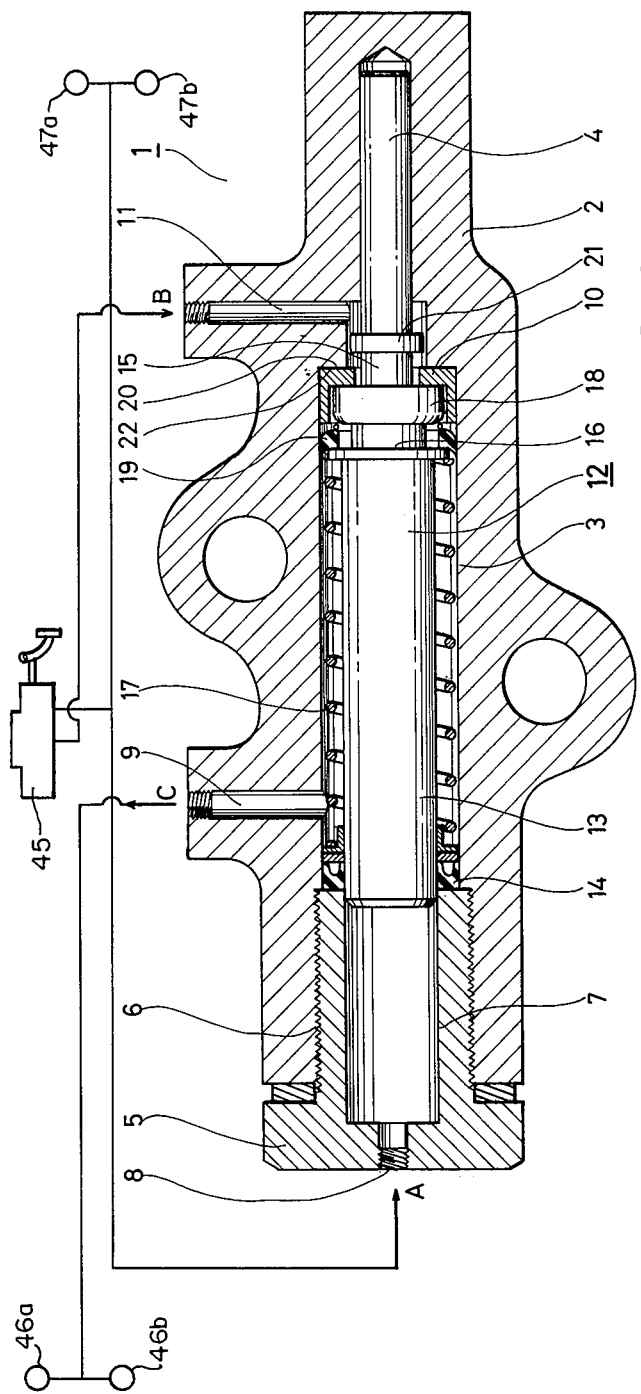
FIG. 1 is a diagrammatic, sectional view of a brake control valve assembly in association with pairs of front and rear brake cylinders and a dual front and rear master cylinder, according to a first embodiment of the present invention.

Referring first to FIG. 1, there is shown a control valve assembly, generally designated by numeral 1, which is to be disposed between the rear master cylinder of a dual (tandem) master cylinder 45, which also contains the front master cylinder, and rear wheel cylinders 46a and 46b. The valve assembly includes a cylinder casing 2, having formed internally thereof a large-diameter cylinder portion 3 in its central section and a small cylinder portion 4 in its front section. Threadably engaged at 6 in the rear section of the casing 2 is an adaptor 5 which has formed therein a medium-sized cylinder 7 arranged coaxial with said large-diameter cylinder portion 3 and having at its rear end a brake fluid pressure inlet 8 which is connected to the front master cylinder (not shown).

In the body portion of said large-diameter cylinder piston 3 is provided a brake fluid discharge port 9 connected to the rear wheel cylinders 46a and 46b while a brake fluid feed port 11 connected to the rear master cylinder (not visible) is provided in a head 10 of the large-diameter cylinder portion 3.

Designated generally by reference numeral 12 is a piston which has a large-diameter piston portion 13, corresponding in diameter to the medium-sized cylinder portion 7 in the adaptor 5, with the rear end of the piston portion 13 being slidably supported by a rear seal 14 of the large-diameter cylinder portion 3, and a small-diameter piston portion 15 which is slidably engaged in the corresponding small-diameter cylinder portion 4, in the casing 2.

It will be also seen that a resilient spring 17 is provided around the large piston portion 13 and between a spring-receiving flange 16 at the front end of the portion 13 and the seal 14, while a front seal valve 19 is interposed between the spring-receiving flange 16 and a head flange 18 provided in front thereof, a leak being provided in the valve 19.

In front of the head flange 18 is provided a flange member 20 defining the end of the large cylinder portion 3 and in close vicinity to the small piston portion 15. A piston sleeve 22 is positioned between the flange member 20 and a carrying flange 21 extending outwardly from the small piston portion 15, the piston sleeve 22 being fitted in the large cylinder portion 3.

According to the above-described arrangement, when the normal dual-system brake performance is maintained, that is, in the situation where pressurized operative brake fluid is being normally supplied to the inlet 8 of the adaptor 5 from the front master cylinder as shown by arrow A, the piston 12 stays at the balanced position shown in FIG. 1 under brake fluid pressure in the cylinder portion 7 of the adaptor 5 concomitant to the braking operation from the front master cylinder (not visible) and pressing force of the resilient spring 17, so that pressurized brake fluid from the simultaneously operated rear master cylinder is forced into the large-diameter cylinder portion 3 from the brake fluid feed port 11 as shown by arrow B, but the piston 12 won't move owing to the balanced relation among brake fluid pressure from the rear master cylinder, brake fluid pressure from the front master cylinder and pressure of the resilient spring 17, and hence pressurized brake fluid from the rear master cylinder flows past the carrying flange 21, the piston sleeve 22, the head flange 18 and the seal valve 19 into the large cylinder portion 3 and thence is forced into the rear wheel cylinders 46a and 46b through the discharge port 9 as shown by arrow C. Thus, when the two hydraulic systems operate operate normally, uniform brake fluid pressure in both front and rear master cylinders is transmitted to the front and rear wheel cylinders 46a, 46b and 47a and 47b, respectively, to perform the required braking operation.

Should the front hydraulic system of the dual-system mechanism fail due to damage in the brake hose or other causes, brake fluid pressure in the cylinder portion 7 supplied through the inlet 8 stays inoperative when the brake is applied, so that when the brake pedal is stepped in, brake fluid pressure is produced in the rear master cylinder alone. Consequently, balance of brake fluid pressure in the cylinder casing 2 collapses, causing the piston 12 to move to the left, as viewed in FIG. 1, due to the difference created between brake fluid pressure from the rear master cylinder and the pressing force of resilient spring 17, and the left end of the head flange 18 is immediately pressed against the right end of the seal valve 19. Thus, the piston 12 moves to the left with the seal valve 19 being pressed rightwise, with the result that the carrying flange 21 becomes engaged with the piston sleeve 22 and moves to the left therewith.

As the left end of the head flange 18 abuts closely against the seal valve 19, brake fluid pressure $P_W$ produced in a section $S_W$ which is equal to the difference between the section of the large cylinder portion 3 and that of the large piston portion 13, and a pressing force F of the resilient spring 17, which is considered substantially constant, acts leftwise to the seal valve 19, while a pressure $P_M$ supplied from the rear master cylinder for a sectional area $S_M$ of the large cylinder portion 3 acts rightwise to the sealing valve 19. Therefore, the pressing force produced in the piston 12 at the time of operation of the rear master cylinder is balanced at:

$$S_W P_W + F = S_M O_M$$

Hence, the brake fluid pressure $P_W$ produced in the differential section $S_W$ for the rear wheel cylinders 46a and 46b is:

$$P_W = S_M/S_W P_M - F/S_W$$

However, from the relation of sectional sizes of the large and small piston portions, $$S_M/S_W > 1$$

Figure 2:
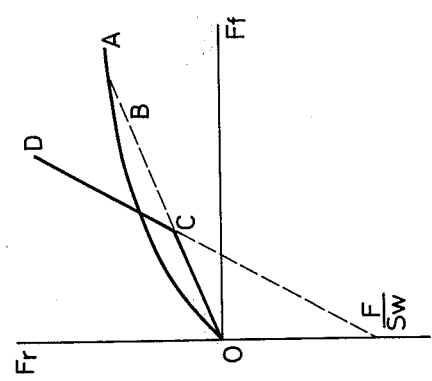
FIG. 2 is a graph illustrating the braking force provided by the brake control valve assembly of FIG. 1.

Therefore, as shown in the graph of FIG. 2 where abscissa is measured as front braking force $F_f$ and ordinate as rear braking force $F_r$, if setting is made such that the dual-system hydraulic operation is represented by straight line B relative to the theoretical braking force distribution curve A, in case the front hydraulic system should fail, the operation line is changed to the straight line D at a point C on the straight line B after the carrying flange 21 abutted against the piston sleeve 22, so that the gradient in the formula becomes greater than 1, and the line is connected to the straight line B at the ordinate point of intersection − F/SW.

While the piston 12 moves to the left with rise of brake fluid pressure in the rear master cylinder, the seal valve 19 receiving a higher brake fluid pressure on its left side than on its right side has its outer edge pressed against the piston sleeve 22 while the inner edge presses against the head flange 18 and tries to retain this position. However, when the piston 12 moves a certain distance to the left, it catches the right end of the piston sleeve 22 with the carrying flange 21 while continuing its movement, so that, while maintaining this condition, the seal valve 19 is pushed by the left end of the piston sleeve 22 to move to the left. Therefore, brake fluid pressure higher than that given at the time of normal dual-system braking operation is quickly applied to the rear wheel cylinder, so that sufficient braking force is provided by the rear braking system alone to well perform the required braking operation.

Figure 3:
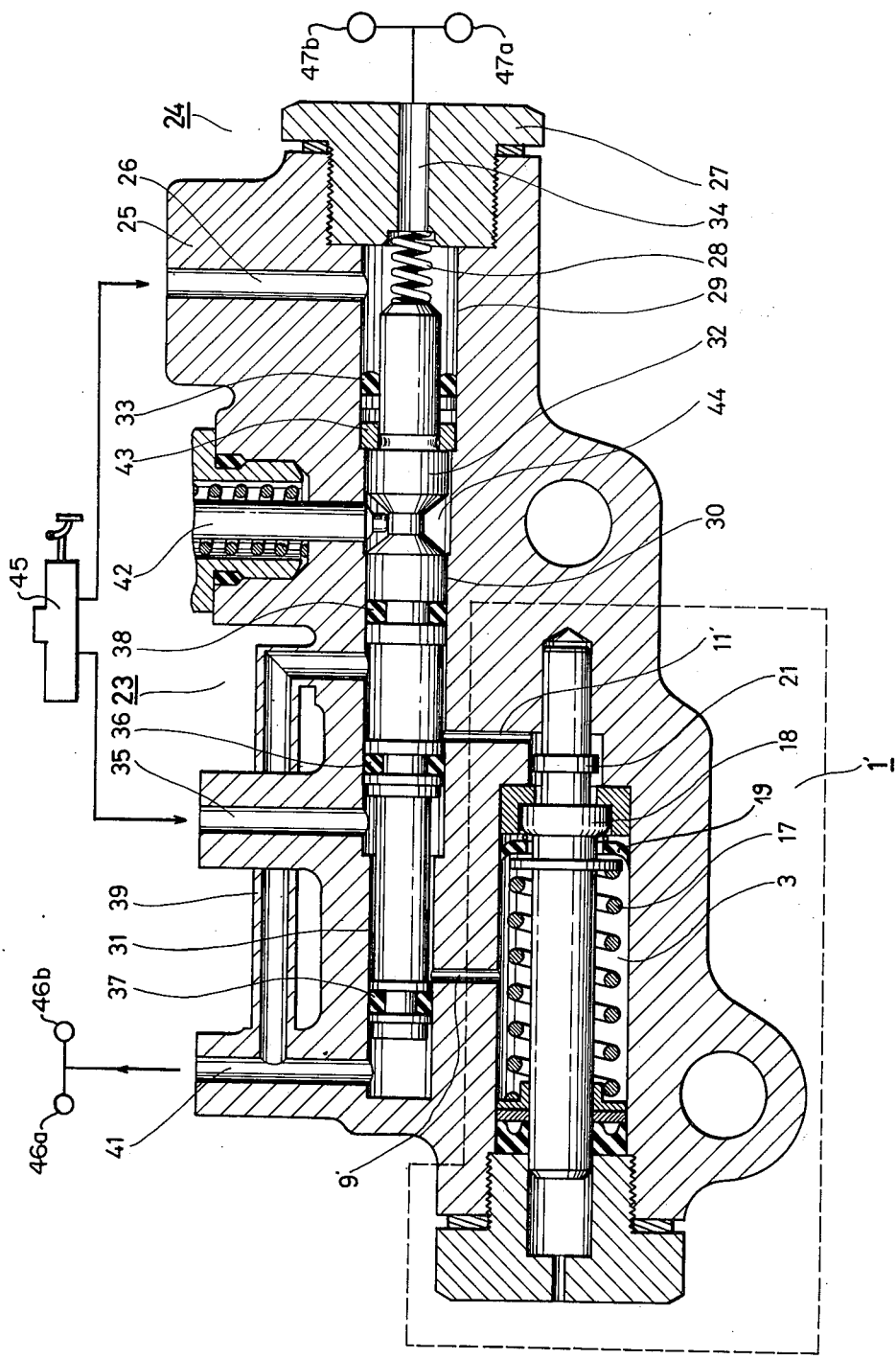
FIG. 3 is a diagrammatic, sectional view of a brake control valve assembly, in association with pairs of front and rear brake cylinders and a dual front and rear master cylinder according to a second embodiment of the present invetion.

Referring now to FIG. 3, there is shown another embodiment of the present invention. This control valve assembly 24 features provision of an introduced pressure switchover piston valve 23 on a body portion 1' of the control valve assembly which is substantially the same as the control valve assembly 1 in the previous embodiment shown in FIG. 1, and this control valve body portion 1' is designed to perform the proportioning valve operation in the normal dual-system hydraulic operation.

When the brake is applied, brake fluid pressure is supplied from a front master cylinder (not visible) contained within a dual (tandem) master cylinder 45 into the valve assembly from a brake fluid feed port 26 provided in a casing 25, forcing a piston sleeve 43 and a piston 32 to move to the left through action of a seal ring 33, while brake fluid pressure is guided into front wheel cylinders 47a and 47b from brake fluid discharge port 34 in an adaptor 27.

Pressurized brake fluid is also supplied from a rear master cylinder (not visible) contained within the master cylinder 45 via another feed port 35 provided in the casing 25. This brake fluid pressure passes through a space defined by seal rings 36 and 37 on the piston 32 disposed in cylinder portions 30 and 31, respectively, and then further passes through brake fluid guide port 9' to enter a large-diameter cylinder piston 3, forcing a seal valve 19 to the left against the force of resilient spring 17, and when the stepping force on the pedal exceeds a certain predetermined level, the piston is urged to move to the left and a head flange 18 abuts against the seal valve 19 to start the so-called proportioning valve operation, whereby, as is well known, brake fluid pressure in the rear wheel cylinder is reduced relatively to brake fluid pressure in the rear master cylinder, that is, there develops a rear braking pressure with the reduced distribution rate relative to the front braking pressure. Thus, the brake fluid pressure is transmitted to the rear wheel cylinders 46a and 46b by passing a port 11' in the casing 25, a compartment defined by seal rings 36 and 38 on the piston 32 in the cylinder 30, a pressure conduit 39 and a brake fluid discharge port 41 in the casing 25, to perform the braking operation based on the proportioning valve action at a predetermined braking force distribution rate. Of course, the brake fluid pressure acting sections of respective cylinder portions 29, 30 and 31 are suitably designed such that the stationary state of the piston 32 will be maintained during the operation.

Should the front hydraulic system fail, brake fluid pressure in the brake fluid discharge port 34, and hence brake fluid pressure in the cylinder portion 29, is reduced to an inoperative level. As design is made such that balance of pressing force on both sides of the piston 32 breaks down owing to proper setting of the sections of the respective cylinder portions 29, 30, 31 and pressing force of the resilient spring 28, the piston 32 moves to the right in the drawing while carrying the piston sleeve 43 therewith, whereby the seal ring 36 on the piston 32 in the cylinder portion 30 positioned between the brake fluid feed port 35 and brake fluid guide port 11' is urged to move between the port 11' and the pressure conduit 39, while the seal ring 37 on the piston 32 in the cylinder portion 31 positioned between the brake fluid guide port 9' and the brake fluid discharge port 41 is urged to move between the brake fluid guide port 9' and brake fluid feed port 35. Consequently, the brake fluid feed port 35 is communicated with the brake fluid pressure guide port 11' while the brake fluid discharge port 41 is communicated with the brake fluid guide port 9', thus effectuating the changeover valve operation between the brake fluid feed port 35, the brake fluid discharge port 41, the brake fluid pressure guide port 11' and the brake fluid guide port 9', resultantly producing the same condition as that of the control valve assembly 1 shown in FIG. 1. Arrangement may also be made such that even if no resilient spring 28 is provided, the abovementioned positional setting can be attained by pushing the piston sleeve 43 to the left while the piston to the right by suitably selecting the right and left force relationship.

Thus, brake fluid pressure of the rear master cylinder supplied from the brake fluid feed port 35 performs the function of a booster valve by the same operation as described in relation to the embodiment of FIG. 1, and therefore brake fluid pressure for giving the rear wheel braking pressure based on the line OCD in FIG. 2 is transmitted to the rear wheel cylinders 46a and 46b from the brake fluid discharge port 50.

Thus, in the embodiment shown in FIG. 3, a proportioning valve action is added to the rear braking operation to effectuate the predetermined braking force distribution during the normal dual-system braking operation, and when the front braking system fails, the rear braking force is increased.

As described above, the assembly of the present invention is characterized principally by a proportioning valve mechanism constituted by a seal valve in the large-diameter cylinder portion and a head flange arranged contactable with the seal valve, the valve mechanism being provided with a piston sleeve disposed between a carrying flange outside of the mechanism and the head flange so that should the front hydraulic system fail the piston is operated to effect engaged movement of the carrying flange and the piston sleeve, whereby the balance between the entire brake fluid pressure from the rear master cylinder for the piston and entire pressure in the rear wheel cylinder collapses to induce a booster valve function to produce a quickly elevating rear wheel braking force exceeding the front and rear wheel braking pressure distribution curve shown in FIG. 2 to give sufficient braking force to the vehicle wheels.

Figure 4:
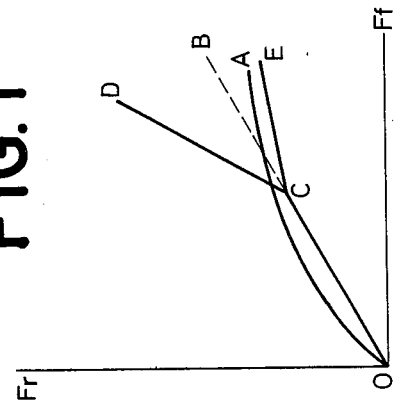
FIG. 4 is a graph illustrating the braking force provided by brake control valve assembly of FIG. 3.

The control valve assembly according to the present invention is also provided with operating brake fluid feed and discharge ports as well as a control piston having the rear master cylinder and rear wheel cylinder change-over valve function, and the piston is directly connected to the pressure guiding section communicated with the front wheel cylinder to allow the changeover operation by guiding pressure to said front wheel cylinder, so that in the normal operation of the dual-system brake assembly there is provided a braking pressure conforming to the proportioning valve operation line OCE shown in FIG. 4, and in the event of failure of the front braking system, the braking pressure is increased as depicted by line OCD in FIG. 4. In conventional control valve assemblies, no such proportioning valve action is made in the event of failure of the front braking system, and hence only an insufficient braking pressure represented by line OCB is provided, as shown in FIG. 4.

In the second embodiment just described, it is possible to provide a brake fluid free notch 44 at a suitable position on the piston 32 and to engage therein a rod 42 connected to an alarm device, as shown in FIG. 3, whereby to alarm or indicate failure of the hydraulic system.

What is claimed is:

1. A brake control valve assembly comprising a cylinder defined by a cylinder casing; a first pressurized brake fluid feed port formed in said cylinder casing for communication with a rear master cylinder; a first pressurized brake fluid discharge port in said cylinder casing for communication with at least one rear wheel cylinder; a piston having a rear end and a front end fitted within said cylinder, said piston being provided between its said ends with a head flange and a spring-receiving flange spaced from one another; a rear seal about said piston in the vicinity of said rear end; a spring between said spring-receiving flange and said rear seal; a seal valve interposed about said piston between said head flange and said spring-receiving flange; a carrying flange formed on said piston and spaced from said head flange of said piston towards its said front end; and a piston sleeve disposed loosely about and between said head flange and said carrying flange, said brake fluid feed port being in fluid communication with space within said cylinder casing between said front end of said piston and said carrying flange and said fluid discharge port being in fluid communication with space within said cylinder casing between said spring-receiving flange and said rear seal.

2. A brake control assembly set forth in claim 1, wherein said cylinder casing includes a port therein for fluid communication between space therein adjacent said rear end of said piston and a front master cylinder.

3. A brake control valve assembly set forth in claim 2, wherein said cylinder casing is provided with a port therein for fluid communication between space therein adjacent said rear end of said piston and a front master cylinder.

4. A brake control valve assembly set forth in claim 1, wherein said carrying flange is provided with a surface providing tight contact with a face of said piston sleeve facing away from said seal valve.

5. A brake control valve assembly set forth in claim 1, wherein said piston sleeve is dimensioned to provide contact with said seal valve along an edge thereof.

6. A brake control valve assembly set forth in claim 1, further including a second cylinder; a controlling piston positioned within said second cylinder and interposed at least in part between said first pressurized brake fluid feed port and said first pressurized brake fluid discharge port, said controlling piston being operatively arranged within said second cylinder to act as a changeover valve for switching from and to the rear master cylinder side and the rear wheel cylinder side of said ports; and a further port in said second cylinder placed adjacent an end face of said second piston to face a pressure introducing section of said second cylinder for communication with at least one front wheel cylinder.

7. A brake control valve assembly set forth in above claim 6, wherein said second cylinder associated with said controlling piston is provided with a pair of pressurized brake fluid feed and discharge ports, a brake fluid feed port from a rear master cylinder, a brake fluid discharge port to a rear wheel cylinder and a pressure conduit wherebetween these feed and discharge ports are positioned.

8. A brake control valve assembly set forth in claim 6, wherein said controlling piston has seal rings for switching said pair of brake fluid feed and discharge ports from and to rear master cylinder side and the rear wheel cylinder side.

9. A brake control valve assembly set forth in claim 6, wherein said controlling piston is engaged with a rod connected to an alarm device.

* * * * *